US012223412B2

(12) United States Patent
Chen et al.

(10) Patent No.: US 12,223,412 B2
(45) Date of Patent: Feb. 11, 2025

(54) DYNAMIC MATRIX CONVOLUTION WITH CHANNEL FUSION

(71) Applicant: Microsoft Technology Licensing, LLC, Redmond, WA (US)

(72) Inventors: Yinpeng Chen, Sammamish, WA (US); Xiyang Dai, Seattle, WA (US); Mengchen Liu, Redmond, WA (US); Dongdong Chen, Bellevue, WA (US); Lu Yuan, Redmond, WA (US); Zicheng Liu, Bellevue, WA (US); Ye Yu, Redmond, WA (US); Mei Chen, Bellevue, WA (US); Yunsheng Li, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1091 days.

(21) Appl. No.: 17/123,697

(22) Filed: Dec. 16, 2020

(65) Prior Publication Data

US 2022/0188595 A1  Jun. 16, 2022

(51) Int. Cl.
*G06N 3/04* (2023.01)
*G06F 17/16* (2006.01)
*G06V 10/70* (2022.01)

(52) U.S. Cl.
CPC .............. *G06N 3/04* (2013.01); *G06F 17/16* (2013.01); *G06V 10/70* (2022.01)

(58) Field of Classification Search
CPC .......... G06N 3/04; G06N 3/045; G06N 3/084; G06F 17/16; G06F 17/153; G06V 10/70
See application file for complete search history.

(56) References Cited

PUBLICATIONS

Cai, et al., "Once for all: Train one network and specialize it for efficient deployment", In Repository of arXiv:1908.09791v1, Aug. 26, 2019, pp. 1-11.
Chen, et al., "Addernet: Do we really need multiplications in deep learning?", In Proceedings of the IEEE/CVF Conference on Computer Vision and Pattern Recognition (CVPR), Jun. 2020, pp. 1468-1477.

(Continued)

*Primary Examiner* — Xiao En Mo
(74) *Attorney, Agent, or Firm* — Alleman Hall & Tuttle LLP

(57) ABSTRACT

A computer device for automatic feature detection comprises a processor, a communication device, and a memory configured to hold instructions executable by the processor to instantiate a dynamic convolution neural network, receive input data via the communication network, and execute the dynamic convolution neural network to automatically detect features in the input data. The dynamic convolution neural network compresses the input data from an input space having a dimensionality equal to a predetermined number of channels into an intermediate space having a dimensionality less than the number of channels. The dynamic convolution neural network dynamically fuses the channels into an intermediate representation within the intermediate space and expands the intermediate representation from the intermediate space to an expanded representation in an output space having a higher dimensionality than the dimensionality of the intermediate space. The features in the input data are automatically detected based on the expanded representation.

20 Claims, 8 Drawing Sheets

(56) References Cited

PUBLICATIONS

Chen, et al., "Dynamic convolution: Attention over convolution kernels", In Proceedings of IEEE Conference on Computer Vision and Pattern Recognition, Jun. 14, 2020, pp. 11030-11039.

Chen, et al., "Dynamic region-aware convolution", In Repository of arXiv:2003.12243v1, Mar. 27, 2020, pp. 1-17.

Chen, et al., "Dynamic ReLU", In Repository of arXiv:2003.10027v2, Aug. 5, 2020, pp. 1-17.

Deng, et al., "Imagenet: A Large-scale Hierarchical Image Database", In IEEE Conference on Computer Vision and Pattern Recognition, Jun. 20, 2009, 8 Pages.

Denton, et al., "Exploiting linear structure within convolutional networks for efficient evaluation", In Journal of Advances in neural information processing systems, Dec. 8, 2014, pp. 1-9.

Ha, et al., "Hypernetworks", In Proceedings of 5th International Conference on Learning Representations, Apr. 24, 2017, pp. 1-18.

Han, et al., "Ghostnet: More features from cheap operations", In Proceedings of IEEE/CVF Conference on Computer Vision and Pattern Recognition (CVPR), Jun. 2020, pp. 1590-1589.

He, et al., "Deep residual learning for image recognition", In Proceedings of the IEEE conference on computer vision and pattern recognition, Jun. 26, 2016, pp. 1770-1778.

Howard, et al., "MobileNets: Efficient Convolutional Neural Networks for Mobile Vision Applications", In Repository of arXiv:1704.04861v1, Apr. 17, 2017, 9 Pages.

Howard, et al., "Searching for mobilenetv3", In Journal of Computing Research Repository, May 2019, 11 Pages.

Hu, et al., "Squeeze-and-Excitation Networks", In Proceedings of IEEE Conference on Computer Vision and Pattern Recognition, Jun. 18, 2018, pp. 7132-7141.

Jarrett, et al., "What is the best multistage architecture for object recognition?", In Proceedings of The IEEE International Conference on Computer Vision, Sep. 29, 2009, pp. 2146-2153.

Kim, et al., "Compression of deep convolutional neural networks for fast and low power mobile applications", In Repository of arXiv:1511.06530v1, Nov. 20, 2015, pp. 1-16.

Kossaif, et al., "Factorized higher-order cnns with an application to spatio-temporal emotion estimation", In Proceedings of IEEE/CVF Conference on Computer Vision and Pattern Recognition, Jun. 13, 2020, pp. 6060-6069.

Lathauwer, et al., "A multilinear singular value decomposition", In SIAM journal on Matrix Analysis and Applications, vol. 21, Issue 4, 2000, pp. 1253-1278.

Lebedev, et al., "Speeding-up convolutional neural networks using fine-tuned cp-decomposition", In Repository of arXiv:1412.6553v1, Dec. 19, 2014, pp. 1-10.

Li, et al., "Selective kernel networks", In Proceedings of the IEEE/CVF Conference on Computer Vision and Pattern Recognition (CVPR), Jun. 2019, pp. 510-519.

Ma, et al., "ShuffleNet V2: Practical Guidelines for Efficient CNN Architecture Design", In Proceedings of the 15th European Conference on Computer Vision, Sep. 8, 2018, 16 Pages.

Ma, et al., "Weightnet: Revisiting the design space of weight networks", In Repository of arXiv:2007.11823v2, Jul. 24, 2020, pp. 1-17.

Nair, et al., "Rectified Linear Units Improve Restricted Boltzmann Machines", In Proceedings of the 27th International Conference on International Conference on Machine Learning, Jun. 21, 2010, 8 Pages.

Phan, et al., "Stable low-rank tensor decomposition for compression of convolutional neural network", In Repository of arXiv:2008.05441v, Aug. 12, 2020, pp. 1-18.

Sandler, et al., "Mobilenetv2: Inverted residuals and linear bottlenecks", In Proceedings of the IEEE Conference on Computer Vision and Pattern Recognition, Jun. 18, 2018, pp. 4510-4520.

Srivastava, et al., "Dropout: A simple way to prevent neural networks from overfitting", In Journal of Machine Learning Research, vol. 15, Issue 56, Jan. 1, 2014, pp. 1929-1958.

Su, et al., "Dynamic group convolution for accelerating convolutional neural networks", In Proceedings of the European Conference on Computer Vision, Aug. 23, 2020, 21 Pages.

Tan, et al., "Efficientdet: Scalable and efficient object detection", In Proceedings of the IEEE/CVF Conference on Computer Vision and Pattern Recognition, Jun. 13, 2020, pp. 10781-10790.

Tan, et al., "Mixconv: Mixed depthwise convolutional kernels", In Proceedings of 30th British Machine Vision Conference, Sep. 9, 2019, pp. 1-13.

Tian, et al., "Conditional convolutions for instance segmentation", In Proceedings of 16th european conference on Computer Vison, Aug. 23, 2020., pp. 1-18.

Yang, et al., "Condconv: Conditionally parameterized convolutions for efficient inference", In Proceedings of 33rd Conference on Neural Information Processing Systems, Dec. 8, 2019, pp. 1-12.

Yu, et al., "Slimmable neural networks", In International Conference on Learning Representations, May 6, 2019, pp. 1-12.

Zhang, et al., "mixup: Beyond empirical risk minimization", In International Conference on Learning Representations, Apr. 30, 2018, pp. 1-13.

Zhang, et al., "Shufflenet: An extremely efficient convolutional neural network for mobile devices", In Proceedings of the IEEE conference on computer vision and pattern recognition, Jun. 2018, pp. 6848-6856.

Zhou, et al., "Rethinking bottleneck structure for efficient mobile network design", In Proceedings of 16th european conference on Computer Vision, Aug. 23, 2020, pp. 1-24.

Tan, et al., "Efficientnet: Rethinking model scaling for convolutional neural networks", In Proceedings of the 36th International Conference on Machine Learning, vol. 97, Jun. 9, 2019, 10 Pages.

DYNAMIC MATRIX CONVOLUTION WITH CHANNEL FUSION

BACKGROUND

Convolution neural networks may be used to detect features in multi-channel numerical data, such as image data. A convolution neural network may use a plurality of different convolution kernel sizes to improve feature detection performance for particular data.

SUMMARY

A computer device for automatic feature detection comprises a processor, a communication device, and a memory configured to hold instructions executable by the processor to instantiate a dynamic convolution neural network, receive input data via the communication network, and execute the dynamic convolution neural network to automatically detect features in the input data. The dynamic convolution neural network compresses the input data from an input space having a dimensionality equal to a predetermined number of channels into an intermediate space having a dimensionality less than the number of channels. The dynamic convolution neural network dynamically fuses the channels into an intermediate representation within the intermediate space and expands the intermediate representation from the intermediate space to an expanded representation in an output space having a higher dimensionality than the dimensionality of the intermediate space. The features in the input data are automatically detected based on the expanded representation in the output space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
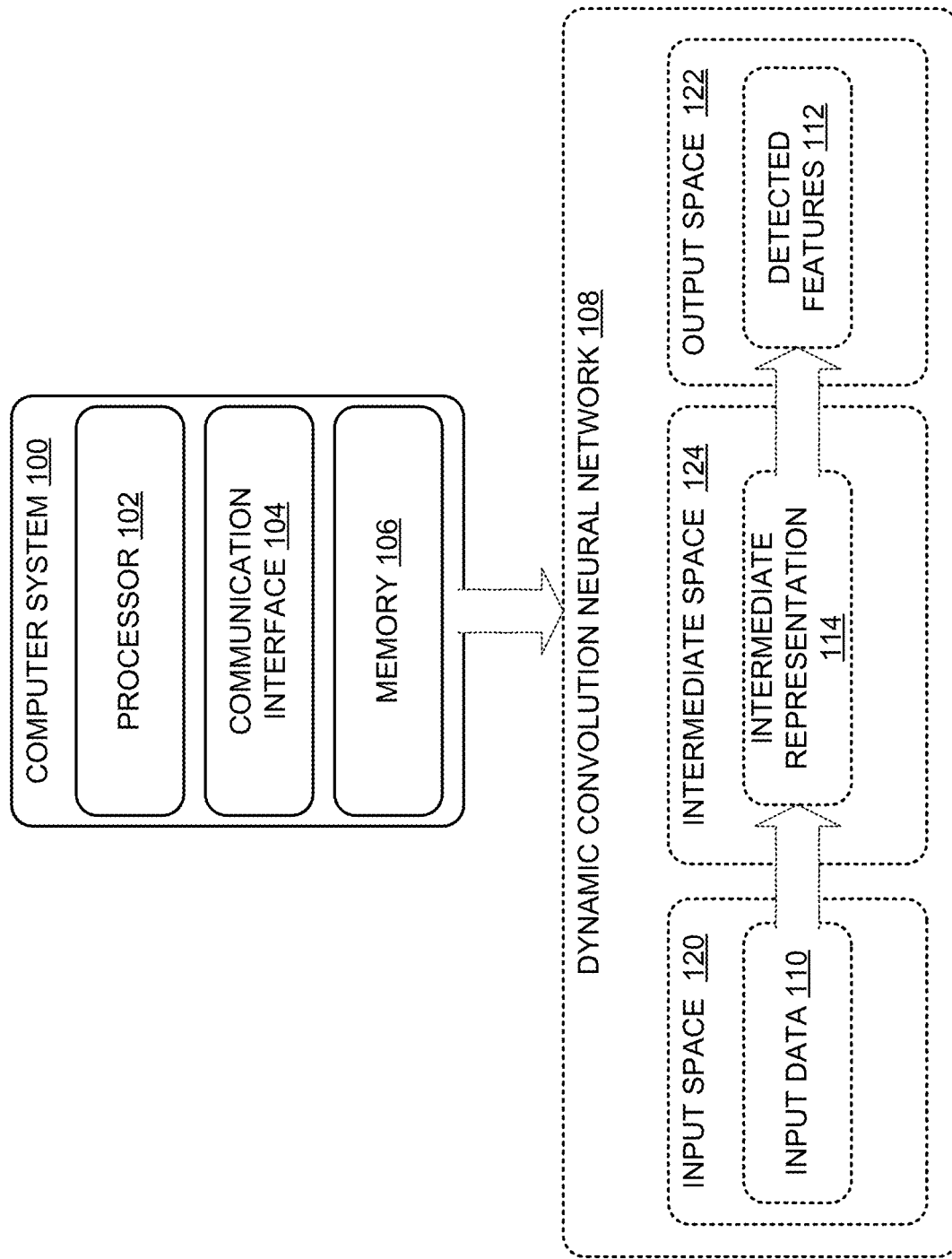
FIG. 1 shows a schematic view of an example feature detection system using dynamic matrix convolution with channel fusion.

Machine learning and/or artificial intelligence techniques may be leveraged to automatically detect features in input data. For example, in computer vision, the input data may be image data and high-level image features such as objects may be detected automatically based on low-level features such as pixel colors, lines, shapes, patterns, or object parts (e.g., detecting a human face based on detecting eyes and a mouth, or detecting eyes based on detecting an oval shape, or detecting an oval shape based on detecting edges, or detecting edges based on detecting a color difference).

Convolutional neural networks can be used for automatic feature detection. Convolutional neural networks assess features at multiple locations within an image using one or more convolution kernels, which are matrix operations that aggregate local information from an image. However, convolutional neural networks may require great computational expense to assess multiple different types of feature within an image at multiple different scales. For example, convolutional neural networks may use a plurality of different convolution kernels to inspect different features and may even use different versions of convolutional kernels for different image scales. Some convolutional neural networks use static kernels and may be referred to herein as static convolutional neural networks.

Dynamic convolution neural networks replace the static convolution kernels of static convolutional neural networks with dynamic kernels, which are data processing operations that can be used at multiple different scales. For example, dynamic convolution neural networks can aggregate multiple convolution kernels dynamically based upon an input-dependent attention function. Dynamic convolution effectively aggregates a plurality of static convolution kernels into a single dynamic kernel operation by using a dynamic attention function that selects which of the static convolution kernels to use for a given input. It is believed that dynamic convolution neural networks may be extended for numerous computational tasks (e.g., computer vision as a non-limiting example), while achieving significant performance improvements (e.g., improved accuracy of feature detection, object classification, etc.) in light-weight, computationally efficient neural networks (e.g., negligible performance cost compared to static convolutional neural networks).

Dynamic convolution effectively uses a weight matrix given by EQ. 1, where K convolution kernels $\{W_k\}$ are aggregated linearly in a weighted sum, weighted by attention scores $\{\pi_k(x)\}$.

$$W(x) = \sum_{k=1}^{K} \pi_k(x) W_k \qquad \text{EQ. 1}$$

$$\text{s.t. } 0 \leq \pi_k(x) \leq 1, \sum_{k=1}^{K} \pi_k(x) = 1$$

However, dynamic convolution neural networks may incur a large computational expense. One approach to dynamic convolution applies the dynamic attention function over a plurality of channel groups after projecting data into a higher dimensional intermediate space, which presents a computational challenge. Dynamic convolution neural networks using dynamic attention functions are not compact, due to using K different kernels that are weighted by the dynamic attention function. Furthermore, the computation may not be efficient due to a large number of parameters (e.g., for a dynamic kernel aggregating the effect of K different kernels, K times as many convolutional weights are needed). Furthermore, dynamic convolution using dynamic attention functions may be difficult to train due to a large state space for training the dynamic kernel operation and a challenging joint optimization problem for learning the dynamic attention scores $\{\pi_k\}$ with static convolution kernels $W_k$. For example, the small attention score $\pi_k$ makes it hard to learn the corresponding kernel $W_k$, especially in early training epochs. Furthermore, the training may converge slowly, for example when using a softmax function to generate a "one-hot" attention function $\pi_k$. Constraints to mitigate these limitations, e.g., near-uniform attention scores, may compromise performance and/or computational efficiency of dynamic convolution neural networks that use dynamic attention.

The present disclosure is directed to a computationally efficient approach to dynamic convolution neural networks that implements dynamic convolution via a matrix decomposition approach. The present disclosure favors a dynamic channel fusion operation over dynamic attention over channel groups. Dynamic channel fusion uses an input-dependent dynamic channel fusion matrix to transform data in a low dimensionality intermediate space, resulting in effectively computing a dynamic residual kernel that represents the aggregation of multiple kernels with suitable attention scores. However, the multiple kernels and attention scores do not need to be computed directly, but are instead effectively determined by the dynamic residual kernel with substantially fewer parameters and less computation during training and operation. Dynamic channel fusion has numerous technical and computational benefits disclosed herein. For example, dynamic channel fusion enables a significant reduction in dimensionality of the intermediate space used in the computation (e.g., lower dimensional intermediate space instead of higher dimensional intermediate space, relative to the input data), resulting in fewer parameters and greater computational efficiency. Furthermore, dynamic channel fusion mitigates the difficulty with joint optimization observed in other approaches that utilize dynamic attention over channel groups. The resulting methodology results in dynamic convolution neural networks that are easier to train, and require substantially fewer parameters (resulting in greater computational efficiency), without resultant reduction in accuracy or performance.

The present disclosure achieves improved performance compared to efficient static convolutional neural networks, for example static convolutional neural networks that utilize depthwise or pointwise convolution, or static convolutional neural networks that utilize matrix decomposition techniques. Furthermore, the techniques of the present disclosure may be further improved using similar approaches such as depthwise or pointwise convolution. It is believed that the techniques disclosed herein may achieve superior performance (e.g., superior accuracy) and simultaneously achieve superior computational efficiency (e.g., fewer parameters and easier convergence during training) as compared to other approaches to dynamic convolutional neural networks using dynamic attention functions, and as compared to state-of-the-art static convolutional neural networks.

FIG. 1 shows a computer system 100 configured for automatic feature detection. Computer system 100 includes a processor 102 configured to execute instructions. Processor 102 may include any suitable logic device(s). Non-limiting examples include one or more sequential processors, vector processors, matrix processors, tensor processors, application-specific logic (e.g., application-specific integrated circuit (ASIC) and/or field-programmable gate array (FPGA)), graphical programming unit(s) (GPU), etc. Computer system 100 further includes a memory 106 configured to hold instructions executable by the processor to instantiate a dynamic convolution neural network 108 configured to perform automatic feature detection. Computer system 100 further includes a communication interface 104. Communication interface 104 may be configured to receive and/or transmit any suitable data, e.g., to receive input data 110 for performing feature detection and/or to output detected features 112 the dynamic convolution neural network 108 detects in the input data.

In some examples, input data 110 may represent an input with one or more channels, wherein the channels each indicate any numerical property of the input data, e.g., pixel channels, color channels, image feature channels, and/or object classification channels. In some examples, input data may comprise a tensor product of different channels, e.g., red, green, and blue (RGB) pixel data comprising RGB color data for each of a plurality of different pixels (e.g., 3×h×w channels for RGB color data for an h×w pixel image). Similarly, detected features 112 may have any suitable format, and detected features 112 may have any suitable number of channels. Non-limiting examples of detected features 112 include image feature channel data including f×h×w output channels indicating a numerical assessment of feature detection among each of f different features at each pixel of the h×w pixel image, or object classification channel data including f channels indicating a numerical assessment of object detection of f different features anywhere within the whole image. Multi-channel input data from which features may be detected may be any suitable data, in any suitable representation. Non-limiting examples of input data include images (e.g., channels for colors, image features such as edges, textures, etc., and/or classified objects), natural language data (e.g., real-valued embeddings of natural language data), intermediate outputs of a neural network or other machine learning program (e.g., feature detection data from an automatic feature detection system such as computing system 110 or any other automatic feature detector). More generally, each of input data 110 and detected features 112 may be any suitable representation of input and detected feature channels, e.g., a number, a vector, a matrix, and/or a tensor. The input data 110 and/or detected features 112 may have any suitable format for representing multi-channel numerical data, e.g., vector data, matrix data, tensor data, floating-point data, fixed-point data, integer, and/or unsigned data.

The instructions held by memory 106 may be executable to perform any suitable logical, numerical, and/or statistical assessments to enact the methods disclosed herein. For example, as will be described further below, the feature detection may be based on vector, matrix, and/or tensor processing algorithms. Furthermore, the instructions may implement any suitable state of the art and/or future machine learning techniques. For example, as will be described further below, the techniques of the present disclosure may be implemented via a machine learning system that is trainable based on a plurality of training instances, wherein a training instance includes training input data and optionally further includes one or more training signals indicating a desired outcome for processing the training input data. Non-limiting examples of training signals include supervised learning training signals (e.g., ground-truth feature detection labels), unsupervised learning training signals (e.g., autoencoder tasks such as data reconstruction from detected features), and/or reinforcement learning training signals (e.g., environment data, simulation data, and/or human evaluation data indicating an assessed performance of feature detection in an environment, simulation, and/or human interaction scenario). Further examples of specific machine learning techniques for training will be described below. In general, the computing system 100 may be continually improved via training, e.g., to improve an accuracy, quality, and/or task-specific performance of feature detection with regard to one or more training data sets. For example, performance may be assessed with regard to one or more test and/or cross-validation data sets.

More generally, memory 106 may also be configured to hold input data 110, detected features 112, intermediate data utilized during the execution of the instructions, training instance data, test and/or cross-validation data, etc. Memory 106 may include any suitable memory device(s), e.g., registers, static random-access memory (SRAM), dynamic random-access memory (DRAM), solid-state drive (SSD), and/or hard disk.

In general, convolutional neural networks can use one or more convolution kernels to detect features based on one or more input data channels, based on relationships between the input data channels. For example, spatial convolutional neural networks for image feature detection may be configured to detect features based on one or more pixel-specific data channels, based on spatial relationships between pixels. More generally, convolutional neural networks may be configured for any suitable computational task including image feature detection, computer vision, natural language processing, etc.

Dynamic convolution neural network 108 is generally configured to assess the presence of one or more features (e.g., detected features 112) in the input data 110 by performing one or more mathematical convolutions (e.g., matrix convolution and/or tensor convolution). Dynamic convolution neural network 108 may be implemented using any current and/or future state of the art machine learning techniques, for example, using dynamic channel fusion techniques that will be described further below. Dynamic convolution neural network 108 may be instantiated with any suitable parameters, e.g., based on machine learning training. Dynamic convolution neural network 108 is configured to compress the input data 110 from a representation in an input space 120 having a dimensionality equal to a predetermined number of channels, into an intermediate representation 114 in an intermediate space 124 having a smaller dimensionality than the number of channels of the input data, and then to expand the intermediate representation 114 into an expanded representation 116 in an output space 122 having a higher dimensionality than the dimensionality of the intermediate space (e.g., a dimensionality equal to a dimensionality of the input space). Dynamic convolution neural network 108 is configured to find the detected features 112 based on the expanded representation 116 in the output space 122.

Figure 2:
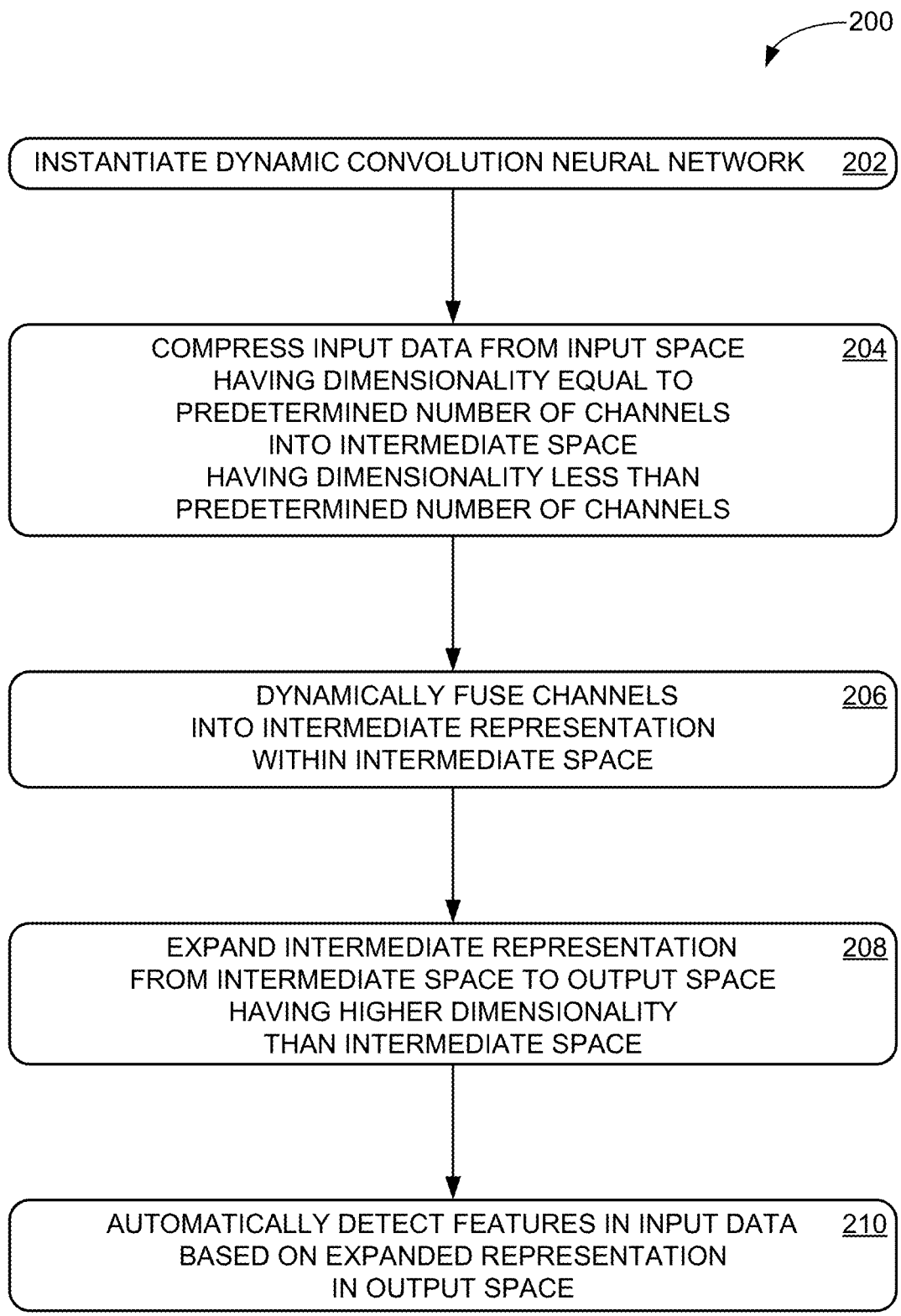
FIG. 2 shows a method of detecting features in input data based on dynamic matrix convolution with channel fusion.

FIG. 2 shows an exemplary method 200 for automatic detection of features in input data by a dynamic convolution neural network. Method 200 may be performed by computer system 100 of FIG. 1 or computing system 700 of FIG. 7, as examples, to operate a dynamic convolution neural network (e.g., dynamic convolution neural network 108).

At 202, method 200 includes instantiating a dynamic convolution neural network. For example, the dynamic convolution neural network may be implemented using any suitable machine learning, artificial intelligence, statistical, matrix, and/or tensor processing techniques. In the present disclosure, "matrix" may be used generally to refer to a vector, matrix, or any other tensor including higher-rank tensors.

At 204, method 200 includes executing the dynamic convolution neural network to compress input data (e.g., image data) from an input space having a dimensionality equal to a predetermined number of channels, into an intermediate space having a dimensionality less than that predetermined number of channels. The predetermined number of channels may be set in any suitable fashion, for example, as a system parameter determined by a machine learning system automatically, by a human designer of the machine learning system, and/or based on input data. For example, the predetermined number of channels may be based on one or more properties of the input data (e.g., a number of color channels, a number of pixels, a number of low-level image features tracked in the input data, or any other suitable property). The input data may be compressed from the input space into the intermediate space via a static compression matrix. The static compression matrix has a plurality of elements that do not depend directly on the input data, but may be parameters of a dynamic convolution neural network (e.g., weights adjusted during training). In some examples, the dimensionality of the intermediate space may be less than a square root of the number of channels. For example, the dimensionality of the intermediate space may be determined by dividing the number of channels by a $2^n$ where n is selected such that the resulting quotient is less than the square root of the number of channels.

At 206, method 200 includes executing the dynamic convolution neural network to dynamically fuse the channels into an intermediate representation within the intermediate space. In other words, the different channels of an input are not handled completely independently and separate from one another, but instead are "fused" into an intermediate space where plural different channels from the original input are considered as one fused intermediate representation in the intermediate space. The channels may be dynamically fused into the intermediate representation within the intermediate space via a dynamic channel fusion matrix. The dynamic channel fusion matrix has a plurality of elements that are each a function of the input data. Because the elements of the dynamic channel fusion matrix are determined for each input based on the specific input data, this matrix "dynamically" fuses the channels into an intermediate representation within the intermediate space. In other words, instead of treating each different set of inputs exactly the same, the dynamic channel fusion matrix is input-dependent. This enables suitable, high-quality channel fusion for each input that the neural network receives, without the computational difficulty of hypothetically knowing how to fuse channels for every possible input in an input-independent/uniform way. The determination of the elements of the dynamic channel fusion matrix may be based on a sub-network of the dynamic convolution neural network, herein referred to as a dynamic layer.

At 208, method 200 includes executing the dynamic convolution neural network to expand the intermediate representation from the intermediate space to an output space having a higher dimensionality than the dimensionality of the intermediate space. For example, the output space may have a dimensionality equal to the original predetermined number of channels, or any other suitable dimensionality (e.g., a dimensionality corresponding to a number of feature classes to detect in the input data). The intermediate representation may be expanded from the intermediate space to the output space via a static expansion matrix. Similar to the static compression matrix, the static expansion matrix has a plurality of elements that do not depend directly on the input data, but may be parameters of a dynamic convolution neural network (e.g., weights adjusted during training).

At 210, method 200 includes executing the dynamic convolution neural network to automatically detect features in the input data (e.g., automatically detecting image features and/or high-level features such as lines, edges, patterns, shapes, objects, etc.) based on the expanded representation in the output space.

The static compression matrix, static expansion matrix, and dynamic channel fusion matrix, when composed together as described above, together represent a composite dynamic residual matrix. The dynamic residual matrix is an input-dependent operation transforming the input data from the input space to the output space, via the intermediate representation in the intermediate space. The static compression matrix and static expansion matrix represent a plurality of matrices, wherein each matrix of the plurality of matrices corresponds to a column of the static compression matrix (e.g., column vector) composed with a row of the static expansion matrix (e.g., row vector), such that the plurality includes each combination of each column from the static compression matrix with every possible row of the static expansion matrix. The column vectors and row vectors have a reduced dimensionality (e.g., the dimensionality of the intermediate space) relative to the input data. As such, each column of the static compression matrix is one potential intermediate embedding of the input data into the intermediate space of reduced dimensionality, and each row of the static expansion matrix is one potential projection of an intermediate embedding into the output space. As such, each of the plurality of matrices represents one possible embedding and corresponding projection. The dynamic channel fusion matrix represents an attention function aggregating attention scores for the plurality of matrices, in the intermediate space. In other words, the dynamic channel fusion matrix represents an attention function for attention scores for each potential embedding into the reduced dimensionality space and projection out of the reduced dimensionality space. As a non-limiting, illustrative example, if the dynamic channel fusion matrix were an identity matrix, then such identity matrix would give equal attention to each matrix resulting from composing a column of the compression matrix and a row of the expansion matrix. In other words, a composite residual matrix resulting from the compression matrix, identity matrix, and expansion matrix would map input channels to output channels, thereby representing a set of possible input-to-output mappings. However, in general the dynamic channel fusion matrix need not be an identity matrix, but instead may be an input-dependent matrix that decides an input-dependent amount of attention with which to weight each possible input-to-output mapping. The attention to possible input-to-output mappings is determined within the reduced-dimensionality, intermediate space. As such, relative to input/output channels, the dynamic channel fusion matrix is able to work on multiple channels at one time (e.g., each dimension in the intermediate space represents one or more input channels, being mapped to one or more output channels). Accordingly, the dynamic channel fusion matrix is able to intelligently select salient combinations of input and output channels so that feature detection in the output space may be based on relevant, input-dependent relationships between input channels and output channels. In other words, the dynamic channel fusion matrix is a suitable input-specific reduced-dimensionality mapping in the intermediate space to achieve a suitable dynamic attention representing the fusion of one or more input channels into the intermediate space and the expansion of a fusion of channels in the intermediate space into one or more output channels in the output space.

As a non-limiting example, for a dynamic convolution neural network configured to detect features of an image that may contain horses and/or cars, input channels may represent low-level image features such as wheel, chassis, road, grass, hoof, ear, human face, etc. Output channels may represent the presence of a horse or the presence of a car at different image locations. The dynamic residual matrix may effectively determine, for a given input, which input features are informative as to the presence of an output feature. For example, the dynamic channel fusion matrix may determine for a given image that roads and wheels may be indicative of the presence of a car. Accordingly, these input channels may be fused into an intermediate channel that, when expanded by the static expansion matrix, is mapped to an output channel indicating presence of a car. For a different input image, the dynamic channel fusion matrix may determine an attention function indicating that wheels may be indicative of presence of a horse (e.g., wheels may be related to a horse-drawn carriage and may indicate proximity to a horse), and the channel for wheels may be fused along with the channels for ears and hooves into an intermediate channel that, when expanded by the static expansion matrix, is mapped to an output channel indicating presence of a horse.

The dynamic residual matrix is based on a singular value decomposition (SVD) according to EQ. 2:

$$W(x) = \sum_{k=1}^{K} \pi_k(x) W_0 + \sum_{k=1}^{K} \pi_k(x) \Delta W_k = W_0 + U\Pi(x)SV^T \qquad \text{EQ. 2}$$

Figure 3A:
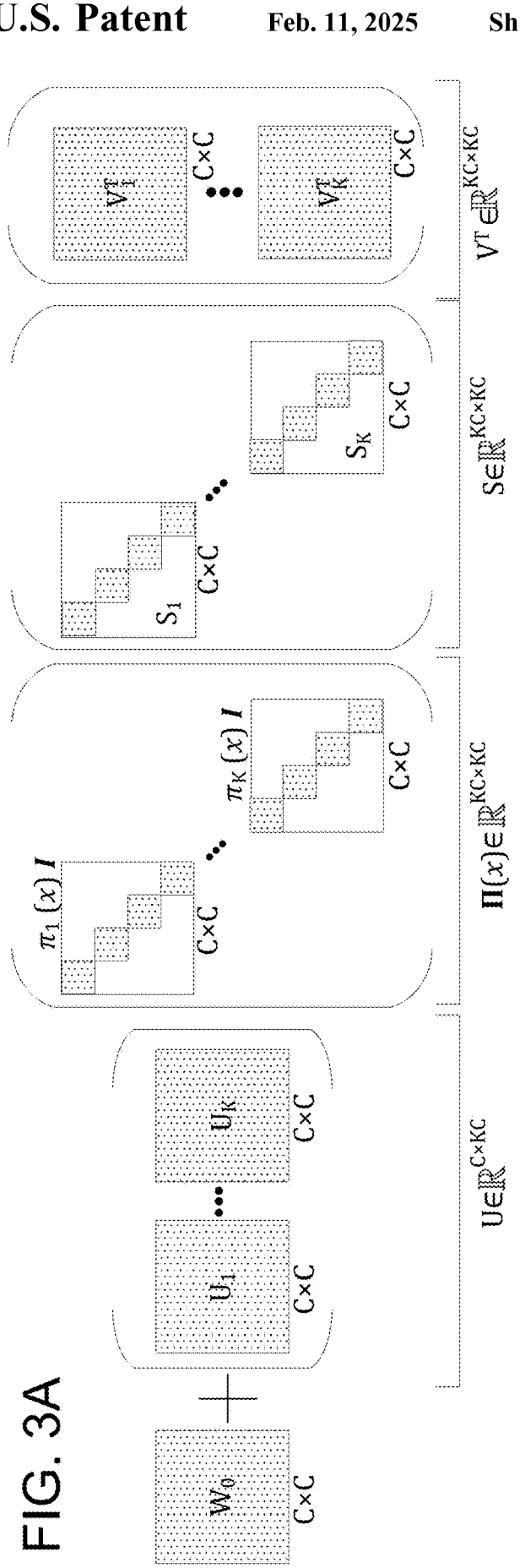
FIG. 3A schematically shows dynamic matrix convolution using a dynamic channel attention function.
Figure 3B:
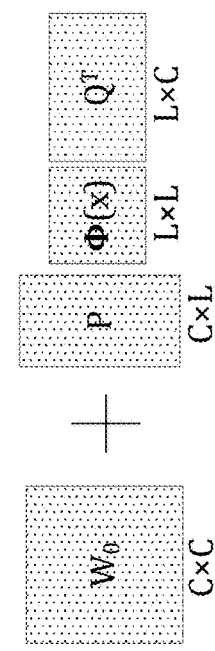
FIG. 3B schematically shows dynamic matrix convolution with channel fusion.

Turning briefly to FIGS. 3A-3B, FIG. 3A illustrates the decomposition from EQ. 2 graphically, in an SVD-based matrix decomposition according to EQ. 2. For the sake of conciseness, the equations disclosed herein are formulated with the assumption that the convolution kernel W has the same number of input and output channels (e.g., the number of channels of the input data is the same as the number of channels of the output space), and neural network bias weights are ignored herein. However, it will be appreciated that the approach described herein may be readily generalized to any number of input and/or output channels, as well as formulated with regard to neural network bias weights. Furthermore, FIGS. 3A-3B focus on a 1×1 convolution, while k×k convolutions are described further below.

FIG. 3A represents an approach to dynamic channel fusion based on dynamic attention over channel groups. In EQ. 2, $W_0$ represents a static average kernel $$W_0 = \sum_k \frac{W_k}{K}$$

that is independent of the particular input. $\Delta W_k = W_k - W_0$ is the residual kernel representing the difference between the average kernel and an input-dependent aggregate kernel. The SVD of $\Delta W_k$ is denoted as $\Delta W_k = U_k S_k V_k^T$. The corresponding singular values and singular vectors are grouped as $U=[U_1, \ldots, U_K]$, $S=\text{diag}(S_1, \ldots, S_K)$, and $V=[V_1, \ldots, V_K]$. $\Pi(x)$ stacks attention scores diagonally, as $\Pi(x)=\text{diag}(\pi_1(x)I, \ldots, \pi_K(x)I)$, where I is an identity matrix.

In other words, dynamic convolution using channel groups as shown in FIG. 3A is implemented by adding a dynamic residual to a static average convolution. The dynamic residual in the above formulation effectively projects the input x into a higher-dimensional space $SV^T x \in \mathbb{R}^{KC}$ (that is, from a space with a dimensionality corresponding to C channels to a space with a dimensionality corresponding to KC channels), applies dynamic attention $\Pi(x)$ over channel groups in the higher dimensional space, and then reduces the dimension back to C channels by multiplying with U. However, dynamic attention over channel groups as shown in FIG. 3A requires a high dimensional intermediate space and small attention values in that intermediate space may suppress learning of the corresponding channels.

The approach shown in FIG. 3A effectively sums KC different rank-1 matrices according to EQ. 3.

$$W(x) = W_0 + U\Pi(x)SV^T = W_0 + \sum_{i=1}^{KC} \pi_{\lceil i/C \rceil}(x) u_i s_{i,i} v_i^T \quad \text{EQ. 3}$$

In EQ. 3, $u_i$ is the $i^{th}$ column vector of matrix U, $v_i$ is the $i^{th}$ column vector of matrix V, $s_{i,i}$ is the $i^{th}$ diagonal entry of matrix S, and $\lceil \cdot \rceil$ is the ceiling operator. However, the static column vectors are not shared across different rank-1 matrices, resulting in model redundancy.

In contrast to FIG. 3A, FIG. 3B depicts a more efficient calculation according to the present disclosure, herein called dynamic convolution decomposition (DCD). DCD applies a dynamic channel fusion matrix $\Phi(x)$ in a lower dimensional space $Q^T(x) \in \mathbb{R}^L$, L<<C. In other words, instead of working in a higher dimensional space, the method of the present disclosure works in a lower dimensional space with L dimensions, wherein L is much smaller than the number of channels C. DCD results in a more compact model. The dynamic channel fusion enables significant dimension reduction in the intermediate space, since L is much smaller than C (e.g., smaller than a square root of C). Accordingly, the number of static parameters is significantly reduced (e.g., LC parameters in P and Q of EQ. 4, as compared to $KC^2$ parameters in U and V of EQ. 2). The dynamic convolution based on dynamic channel fusion is re-formulated according to EQ. 4.

$$W(x) = W_0 + P\Phi(x)Q^T = W_0 + \sum_{i=1}^{L} \sum_{j=1}^{L} p_i \phi_{i,j}(x) q_j^T \quad \text{EQ. 4}$$

Dynamic channel fusion effectively replaces dynamic attention over channel groups. Specifically, dynamic channel fusion is represented by the fully dynamic (input-specific) matrix $\Phi(x)$ of dimension L×L, of which each element $\phi_{i,j}(x)$ is a function of the input x. As shown in FIG. 3B, the dynamic residual is reformulated as a product $P\Phi(x)Q^T$ resulting from a composition of $\Phi(x)$ and two static matrices P (the static expansion matrix) and Q (the static compression matrix). In other words, Q squeezes the input into a low-dimensional intermediate space, $\Phi(x)$ dynamically fuses the channels in the intermediate space, and P expands the fused channels to the output space.

The dynamic channel fusion matrix enables significant dimension reduction in the intermediate space $Q^T(x) \in \mathbb{R}^L$, without performance degradation. The number of parameters in the static expansion and compression matrices P,Q is substantially reduced. Nevertheless, performance is not compromised as the dynamic channel fusion approach retains representation power.

Mathematically, the dynamic residual matrix sums $L^2$ different rank-1 matrices $p_i \phi_{i,j}(x) q_j^T$, where $p_i$ is the $i^{th}$ column vector of P and $q_j$ is the $j^{th}$ column vector of Q. The number of rank-1 matrices $L^2$ is much less than the counterpart shown in FIG. 3A and EQS. 2-3, namely KC rank-1 matrices, because L is much smaller than C (e.g., L is less than the square root of C).

Dynamic channel fusion also mitigates the joint optimization challenge as compared to other approaches to dynamic convolution (e.g., as compared to FIG. 3A), as each column in the matrices P,Q is associated with multiple dynamic coefficients in $\Phi(x)$. Therefore, presence of dynamic coefficients with small values does not suppress the learning of the static matrices P,Q.

The dynamic convolution neural network is generally configured to compute a convolution of the input data based on the dynamic residual matrix, e.g., a convolution of the input data by the dynamic residual matrix.

In some examples, the convolution of the input data may be based on a sum of the dynamic residual matrix with a static average kernel matrix. In some examples, the static average kernel matrix is weighted by composition with a dynamic channel-wise attention diagonal matrix. As a non-limiting illustrative example, the dynamic channel-wise attention diagonal matrix may be an identity matrix, e.g., indicating equal weighting for each column of the static average kernel matrix. In other examples, however, the dynamic channel-wise attention matrix may be any other matrix. In some examples, the static average kernel matrix may be multiplied by a dynamic scalar, e.g., $\Sigma_k \pi k(x)$ which is canceled in EQ. 2 as attention scores sum to one. However, the constraint that attention scores sum to one may be relaxed, in order to create a channel-wise dynamic attention shown in EQ. 5:

$$W(x) = \Lambda(x)W_0 + P\Phi(x)Q^T \quad \text{EQ. 5:}$$

In EQ. 5, $\Lambda(x)$ is a C×C dynamic channel-wise attention diagonal matrix, of which each element $\lambda_{i,i}(x)$ is a function of the input data x. EQ. 4 is a special case in which the dynamic channel-wise attention diagonal matrix $\Lambda(x)$ is an identity matrix. However, using a non-identity matrix may result in performance improvements; accordingly, the dynamically channel-wise attention diagonal matrix may be computed dynamically for a given input, similar to the dynamic channel fusion matrix.

The dynamic channel fusion matrix and/or dynamic channel-wise attention matrix may be determined in an input-specific fashion by a dynamic convolution decomposition layer, that is, a dynamic branch of the dynamic convolution neural network configured to compute elements of these matrixes for any given input.

Figure 4:
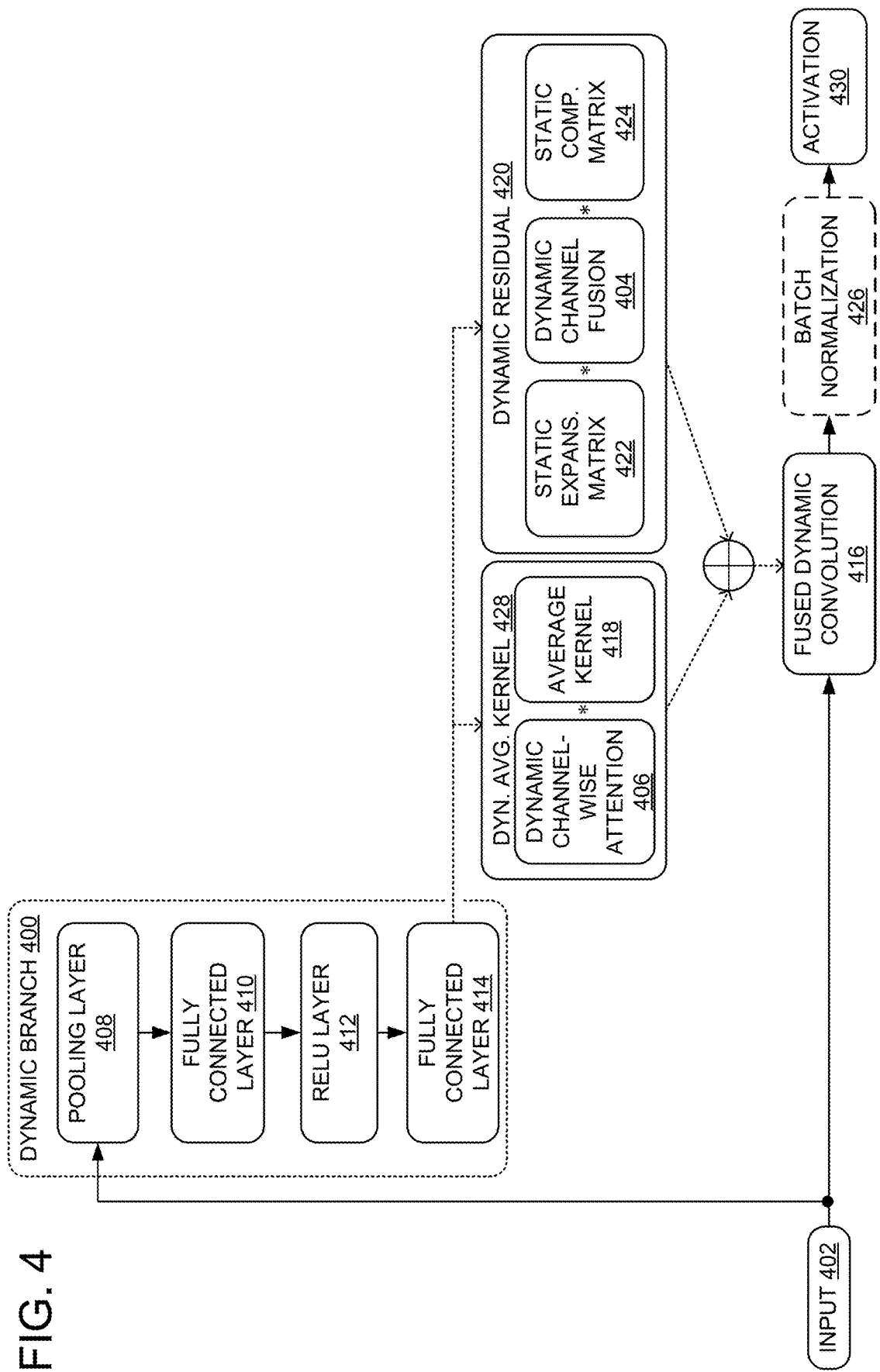
FIG. 4 schematically shows a dynamic convolution decomposition layer of a dynamic convolution neural network.

FIG. 4 illustrates a non-limiting example of a dynamic convolution decomposition layer configured to process an input 402 and eventually to return an activation function 430. The blocks in the diagram indicate neural network layers. The dashed lines indicate model parameter flow through the layers. The solid lines indicate data flow through the layers.

The input is used in two branches, including a convolution data flow along the bottom of the figure, and a dynamic branch 400 along the top of the figure. The dynamic branch 400 is configured to compute, for any given input 402, parameters for the overall computation in the layer including a suitable dynamic channel fusion matrix 404 and a suitable dynamic channel-wise attention matrix 406 for that input 402. In some examples, the dynamic branch is configured to compress the input via a pooling layer 408. In some examples, the dynamic branch may be configured to process the input via a fully connected neural network layer 410 configured to output the elements of the dynamic channel fusion matrix. As a specific non-limiting example, the dynamic branch may have a neural network architecture including a pooling layer 408 (e.g., average pooling or max pooling), a first fully-connected neural network layer 410, a rectified linear unit (ReLU) layer 412, and a second fully-connected neural network layer 414. As a non-limiting example architecture, the first fully connected layer 410 may be configured to reduce the number of channels, while the second fully connected layer 414 is configured to output coefficients for the dynamic channel fusion matrix 404 and the dynamic channel-wise attention matrix 406.

In the bottom path in the diagram, the input is processed via a fused dynamic convolution operation 416 which is computed according to EQ. 5 as a sum of 1) the dynamically-attended average kernel matrix 428 comprising the dynamic channel-wise attention matrix 406 composed with the average kernel matrix 418, and 2) the dynamic residual matrix 420 comprising the composition of the static expansion matrix 422, the dynamic channel fusion matrix 404, and the static expansion matrix 424.

Activation function 430 computes a value in the output space, determined based on the input data 402 and the fused dynamic convolution operation 416 (e.g., based on processing the input data with a matrix operation defined by a sum of the dynamic residual matrix and the static average kernel matrix). In some examples, an optional batch normalization layer 426 is used to normalize the result of fused dynamic convolution 416 before activation function 430.

A dynamic convolution neural network according to method 200 may be trained in any suitable fashion, for example, to select suitable parameters for the static compression matrix and the static expansion matrix, as well as to select a suitable input-dependent function for determining the dynamic channel fusion matrix and the dynamic channel-wise attention matrix. Accordingly, the dynamic branch of the dynamic convolution neural network may be adjusted during training of the dynamic convolution neural network. As a non-limiting example, the dynamic convolution neural network may be trained via supervised training by adjusting the parameters of the dynamic branch based on a ground-truth label for the activation function computed by the dynamic branch. For example, parameters of the dynamic branch may be adjusted using backpropagation with stochastic gradient descent, or any other training method for neural networks. For example, backpropagation may be used to determine stochastic gradient descent updates to weights of the fully connected layers of the dynamic branch, the ReLU layer of the dynamic branch, the pooling layer of the dynamic branch, the static compression matrix, the static expansion matrix, and the static average kernel matrix. In general, it will be appreciated that the dynamic branch described herein may be used as a layer in any suitable neural network architecture, and adjusted via any suitable training methodology.

The methodology described above facilitates numerous potential extensions to the dynamic convolutional neural network, non-limiting examples of which are described below. In examples describe above, the dynamic convolution neural network is configured to compute a 1×1 or pointwise convolution, optionally including dynamic attention across channels according to EQ 5. This non-limiting, exemplary pointwise convolution may be extended in various ways.

Figure 5:
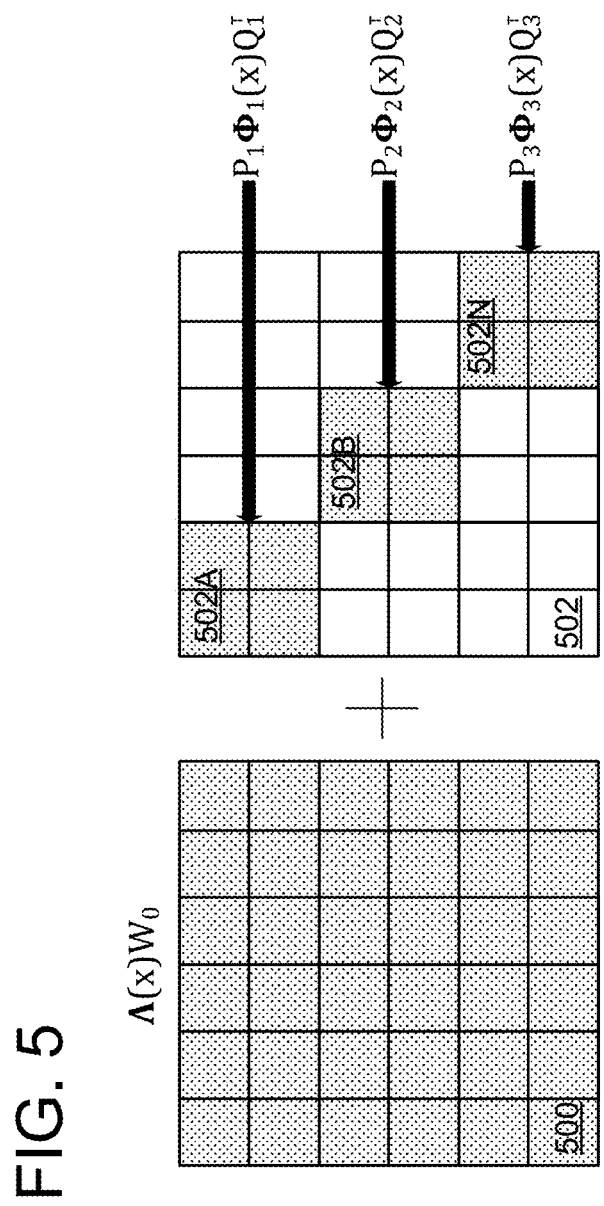
FIG. 5 schematically shows a sparse dynamic residual for dynamic matrix convolution.

In some examples, as shown in FIG. 5, dynamic convolution may use a sparse dynamic residual matrix formulated as a sum of an average kernel matrix 500 plus a diagonal block matrix 502 comprising a plurality of blocks (e.g., 502A, 502B through 502N), thereby further reducing the complexity of the model. In other words, the dynamic residual matrix may be simplified via sparsity. A non-limiting example is using a diagonal block matrix, wherein each block is decomposed separately as $P_b\Phi_b(x)Q_b^T$, $b \in [1, B]$ where B is the number of diagonal blocks. Mathematically, the sparse dynamic residual is represented by EQ. 6.

$$\Lambda(x)W_0 + \oplus_{b=1}^{B} P_b \Phi_b(x) Q_b^T \qquad \text{EQ:6}$$

In EQ. 6, $\oplus$ is a matrix direct sum, i.e., $\oplus_{i=1}^{n} A_i = \text{diag}(A_1, \ldots A_n)$. Note that EQ. 5 is a special case of EQ. 6 with B=1. The static kernel $W_0$ is still a full matrix, in other words, only the dynamic residual component of the fused dynamic convolution matrix is sparse. As will be discussed later, it is believed that using a value of B=8 results in only a slight performance degradation as compared to B=1, while achieving superior computational efficiency and superior accuracy compared to static convolutional neural networks.

As another example, the pointwise convolution may be extended to a k×k depthwise convolution, optionally using dynamic attention across neural network layers, where k refers to a depthwise kernel size. Alternately or additionally, the dynamic convolution neural network may be configured to utilize dynamic fusion of latent kernel elements. The weights of a k×k depthwise convolution form a C×k² matrix. The dynamic decomposition of such matrix may be easily extended from EQ. 5 by replacing the static compression matrix Q with a static depthwise compression matrix R configured to compress the number of kernel elements according to EQ. 7.

$$W(x) = \Lambda(x)W_0 + P\Phi(x)R^T \qquad \text{EQ. 7:}$$

In EQ. 7, W(x) and $W_0$ are C×k² matrices. $\Lambda(x)$ is the usual C×C channel-wise attention diagonal matrix. R is of shape $k^2 \times L_k$, reducing the number of kernel elements from $k^2$ to $L_k$. $\Phi(x)$ is of shape $L_k \times L_k$ and performs dynamic fusion along $L_k$ latent kernel elements. P is of shape $C \times L_k$ and is a weight matrix for depthwise convolution over $L_k$ latent kernel elements. The default value of $$L_k = \left\lfloor \frac{k^2}{2} \right\rfloor.$$

Depthwise channel convolution is channel separable. Therefore, $\Phi(x)$ does not fuse channels, but instead, fuses $L_k$ latent kernel elements.

Figure 6A:
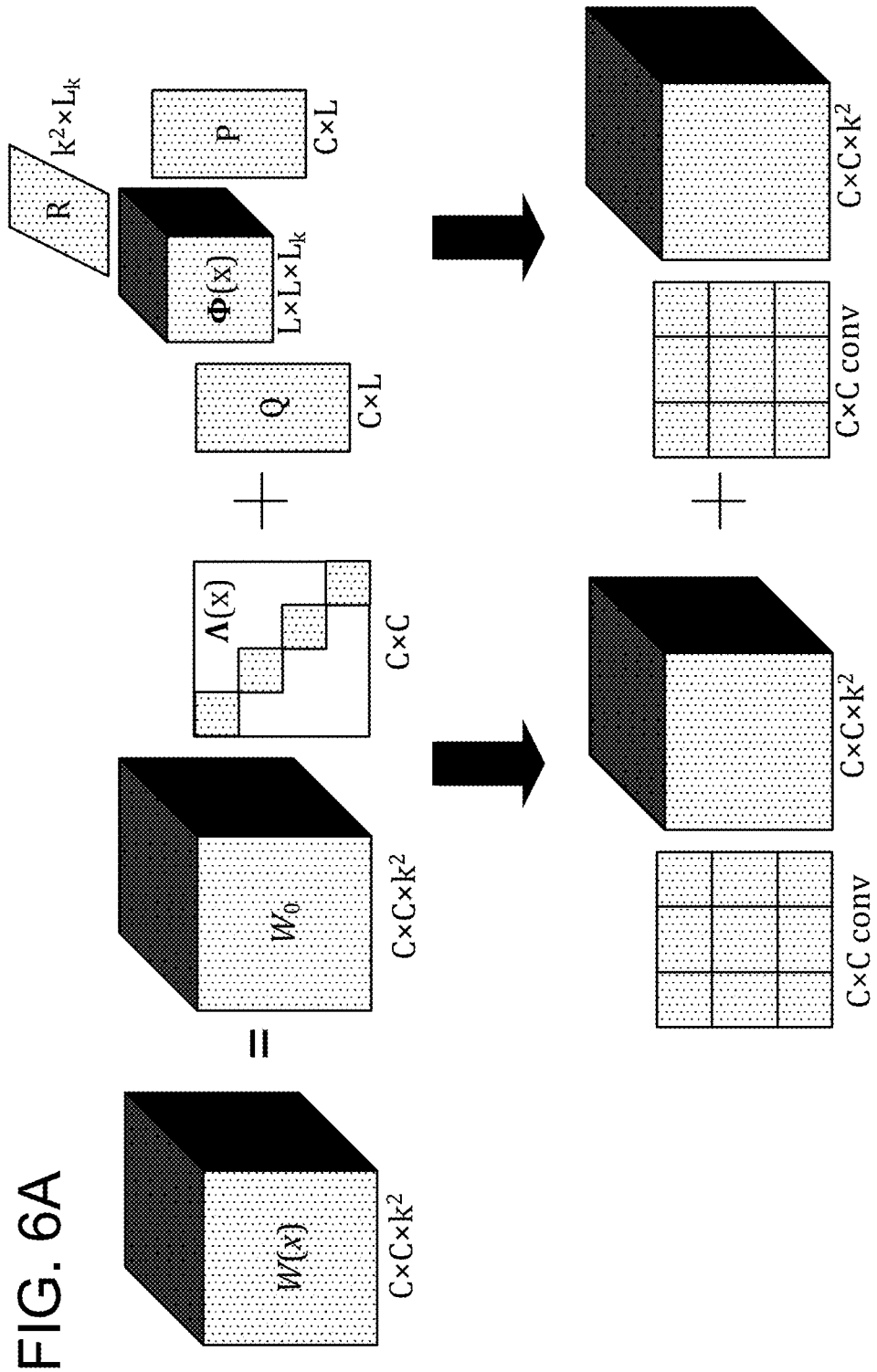
FIGS. 6A-6B schematically show dynamic convolution decomposition using a k×k convolution kernel.

In some examples, as shown in FIG. 6A, the dynamic convolution neural network is configured to compute a k×k spatial convolution, where k refers to a spatial kernel size. For example, the spatial convolution may include dynamic fusion of channels. In some examples, the dynamic fusion of channels may include joint fusion of channels and latent kernel elements. For example, a k×k kernel forms a C×C×k² tensor, with a dynamic decomposition defined by extending EQ. 5 to a tensor form as shown in EQ. 8.

$$W(x) = W_0 \times_2 \Lambda(x) + \Phi(x) \times_1 Q \times_2 P \times_3 R \qquad \text{EQ. 8:}$$

In EQ. 8, $\times_n$ refers to n-mode tensor multiplication. $W_0$ is of shape C×C×k². As in other formulations, $\Lambda(x)$ is a channel-wise attention diagonal C×C matrix. Q is of shape C×L, and compresses the number of input channels from C to L. R is of shape $k^2 \times L_k$ and reduces the number of kernel elements from $k^2$ to $L_k$. $\Phi(x)$ is of shape $L \times L \times L_k$, and represents joint fusion of L channels over $L_k$ latent kernel elements. P is of shape C×L, and expands the number of channels from L to C output channels. The number of latent channels L and the number of latent kernel elements $L_k$ are constrained so that $L_k < k^2$ and $L^2 L_k \leq C$. For example, default values for L and $L_k$ may be determined as $$L_k = \left\lfloor \frac{k^2}{2} \right\rfloor \text{ and } L = \left\lfloor \frac{C/L_k}{2\lfloor \log_2 \sqrt{C/L_k} \rfloor} \right\rfloor.$$

Figure 6B:
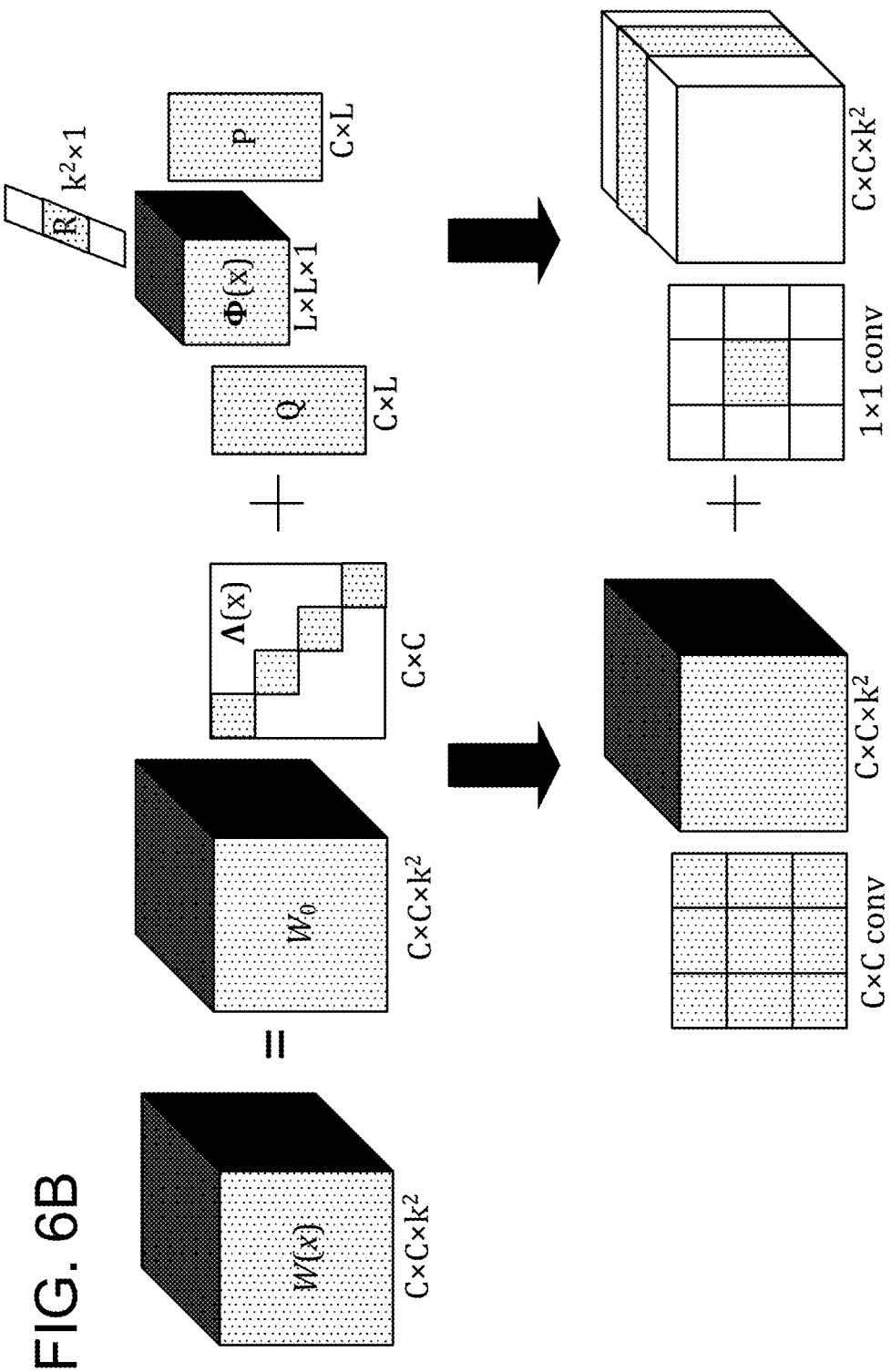

In some examples, as shown in FIG. 6B, instead of using joint fusion of channels and fusion of kernel elements, it may be advantageous to utilize fusion of channels $\Phi(x) \times_1 Q$ without fusion of kernel elements $\Phi(x) \times_3 R$. For example, fusion of channels may be more important for accuracy than fusion of kernel elements. Accordingly, $L_k$ may be reduced to 1, and L may be increased accordingly. In such case, R may be simplified as a one-hot vector $[0, \ldots, 0, 1, 0, \ldots 0]^T$, in which the 1 is located at the center (assuming k is an odd number), in other words, such that the tensor of the dynamic residual $\Phi(x) \times_1 Q \times_2 P \times_3 R$ has only one non-zero slice, which is equivalent to a 1×1 convolution. Therefore, DCD of a k×k convolution may be regarded as adding a 1×1 dynamic residual on top of a static k×k kernel convolution.

The methods disclosed herein may present numerous benefits for accurate and/or computationally efficient feature detection. As a non-limiting example, the methods of the present disclosure may be used on Image Net, which presents feature detection tasks with 1000 feature classes for detection. The methods of the present disclosure may be applied, for example, to train a dynamic convolution neural network on more than one million training images, and assess performance of the dynamic convolution neural network on as many as 50,000 images or more, for validation. The dynamic convolution techniques of the present disclosure may be used with multiple different convolutional neural network architectures. Non-limiting examples include RESNET and MOBILENETV2. Dynamic convolution neural networks according to the present disclosure are believed to result in a substantial and statistically significant performance improvement relative to a baseline static convolutional neural network with a similar architecture, for example, it is believed that dynamic convolution neural networks may obtain accuracy improvements of 1-6% or more for various feature detection tasks with various different configurations of the dynamic convolution neural network with fewer parameters than a static convolutional neural network, e.g., with 50%, 33%, or 25% as many parameters. It is believed that the channel fusion techniques described herein may allow faster convergence relative to other dynamic convolution implementations. It is believed that extensions such as dynamic channel fusion and dynamic channel-wise attention may significantly boost the accuracy of a convolutional neural network implemented according to the techniques of the present disclosure, e.g., by 2-4% or more.

The dynamic convolution techniques of the present disclosure may be applied in a plurality of different ablation conditions, selectively incorporating or omitting techniques described herein, including dynamic channel fusion, dynamic channel-wise attention, variable dimensionality of the intermediate space L, and/or variable number of diagonal block subdivisions B in a dynamic residual matrix. It is believed that even when the intermediate space L has a relatively reduced dimensionality (e.g., 25% as many channels relative to a full dimensionality for the intermediate space), a convolutional neural network implemented with the dynamic convolution techniques of the present disclosure may achieve a significant accuracy improvement over a static convolutional neural network (e.g., 3-5% improvement or more), while simultaneously potentially achieving superior computational efficiency due to a reduced number of parameters of the reduced dimensionality space. It is believed that the dynamic residual may be made sparser, e.g., the dynamic residual may be a full matrix, or a matrix with ½, ¼, or ⅛ of its entries being non-zero (as described above with regard to FIG. 5). It is believed that accuracy may be minimally degraded by using a sparser dynamic residual, e.g., obtaining a performance improvement of 2-5% over a static convolutional neural network. It is believed, based on experiments, that superior performance relative to static convolutional neural networks may be achieved using both dynamic channel fusion and dynamic channel-wise attention, with a default residual space size L and a full dynamic residual B. Furthermore, it is believed that a dynamic convolution neural network may be made more compact (e.g., resulting in fewer parameters, easier training, greater computational processing and/or memory efficiency, and/or a simpler or more interpretable model) by removing dynamic channel-wise attention, reducing dimensionality of the intermediate space L, making the dynamic residual sparser, and/or using dynamic channel decomposition techniques in a depthwise convolution alone, according to any of the configurations disclosed herein. It is believed that performance degradation when the dynamic convolution neural network is made more compact may be minimal, e.g., performance may nevertheless be acceptable while obtaining superior computational performance characteristics in training and/or operation. Accordingly, dynamic convolution neural networks according to the present disclosure may present numerous opportunities for system design, improvement, and parametrization, e.g., selecting parameters for prioritizing accuracy, prioritizing computational efficiency, or any suitable ablation described herein allowing a trade-off between accuracy and computational efficiency, e.g., obtaining a desired level of accuracy with a desired level of computational efficiency.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 7:
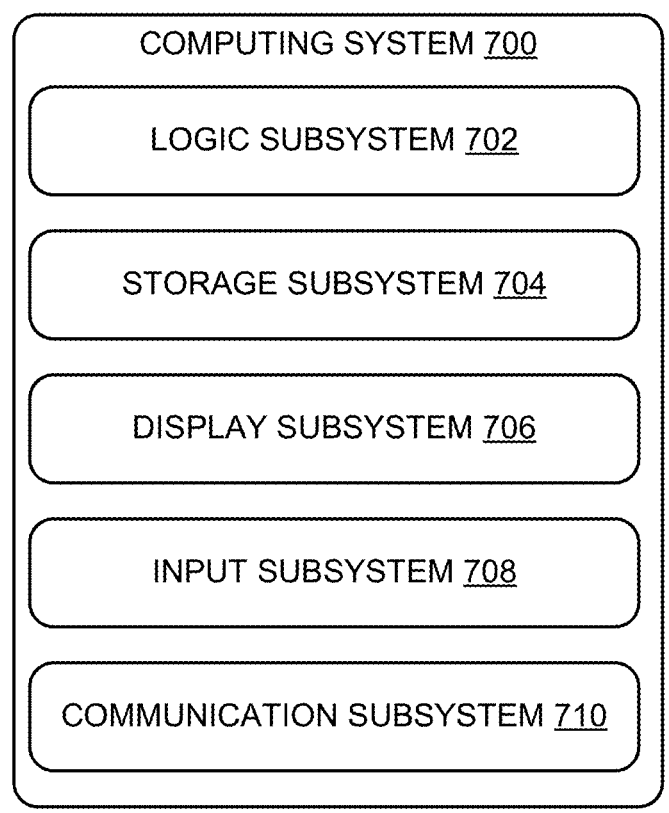
FIG. 7 shows an exemplary computing system.

FIG. 7 schematically shows a simplified representation of a computing system 700 configured to provide any to all of the compute functionality described herein. Computing system 700 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 700 may be a computing system 100 of FIG. 1. More generally, computing system 100 may implement method 200 of FIG. 2 and/or one or more dynamic convolution neural network layers as shown in FIG. 4.

Computing system 700 includes a logic subsystem 702 and a storage subsystem 704. Computing system 700 may optionally include a display subsystem 706, input subsystem 708, communication subsystem 710, and/or other subsystems not shown in FIG. 7.

Logic subsystem 702 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 704 includes one or more physical devices configured to temporarily and/or permanently hold computer information such as data and instructions executable by the logic subsystem. When the storage subsystem includes two or more devices, the devices may be collocated and/or remotely located. Storage subsystem 704 may include volatile, nonvolatile, dynamic, static, read/write, read-only, random-access, sequential-access, location-addressable, file-addressable, and/or content-addressable devices. Storage subsystem 704 may include removable and/or built-in devices. When the logic subsystem executes instructions, the state of storage subsystem 704 may be transformed—e.g., to hold different data.

Aspects of logic subsystem 702 and storage subsystem 704 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)). Furthermore, the machine learning techniques described herein may be incorporated with any other ML, AI, and/or NLP technologies, e.g., the dynamic convolution neural network layer of FIG. 4 described herein may be a layer in any current or state-of-the-art neural network.

In some examples, the methods and processes described herein (for example, method 200 of FIG. 2, and/or the dynamic convolution neural network layer of FIG. 4) may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 706 may be used to present a visual representation of data held by storage subsystem 704. This visual representation may take the form of a graphical user interface (GUI). Display subsystem 706 may include one or more display devices utilizing virtually any type of technology. In some implementations, display subsystem may include one or more virtual-, augmented-, or mixed reality displays.

When included, input subsystem 708 may comprise or interface with one or more input devices. An input device may include a sensor device or a user input device.

Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 710 may be configured to communicatively couple computing system 700 with one or more other computing devices. Communication subsystem 710 may include wired and/or wireless communication devices compatible with one or more different communication protocols. The communication subsystem may be configured for communication via personal-, local- and/or wide-area networks.

In a nonlimiting example, a computer system for automatic feature detection, comprises: a processor; a communication interface; and a memory configured to hold instructions executable by the processor to: instantiate a dynamic convolution neural network; receive input data via the communication interface; execute the dynamic convolution neural network to: compress the input data from an input space having a dimensionality equal to a predetermined number of channels into an intermediate space having a dimensionality less than the number of channels; dynamically fuse the channels into an intermediate representation within the intermediate space; and expand the intermediate representation from the intermediate space to an expanded representation in an output space having a higher dimensionality than the dimensionality of the intermediate space; and automatically detect features in the input data based on the expanded representation in the output space.

In a nonlimiting example, a method of computer-detecting features in an image, comprises: instantiating a dynamic convolution neural network configured to: compress an image from an input space having a dimensionality equal to a predetermined number of channels into an intermediate space having a dimensionality less than the number of channels; dynamically fuse the channels into an intermediate representation within the intermediate space; and expand the intermediate representation from the intermediate space to an output space having a higher dimensionality than the dimensionality of the intermediate space; and executing the dynamic convolution neural network to detect the features in the image.

In a nonlimiting example, a method of computer-detecting features in input data, comprises: instantiating a dynamic convolution neural network configured to: compress the input data from an input space having a dimensionality equal to a predetermined number of channels into an intermediate space having a dimensionality less than the number of channels; dynamically fuse the channels into an intermediate representation within the intermediate space; and expand the intermediate representation from the intermediate space to an output space having a higher dimensionality than the dimensionality of the intermediate space; and executing the dynamic convolution neural network to detect the features in the input data. In this and/or other examples, the input data is compressed from the input space into the intermediate space via a static compression matrix. In this and/or other examples, the channels are dynamically fused into the intermediate representation within the intermediate space via a dynamic channel fusion matrix having a plurality of elements that are each a function of the input data. In this and/or other examples, the intermediate representation is expanded from the intermediate space to the output space via a static expansion matrix. In this and/or other examples, the input data is compressed from the input space into the intermediate space via a static compression matrix; the channels are dynamically fused into the intermediate representation within the intermediate space via a dynamic channel fusion matrix having a plurality of elements that are each a function of the input data; the intermediate representation is expanded from the intermediate space to the output space via a static expansion matrix; and the static compression matrix and the static expansion matrix represent a plurality of matrices, each matrix of the plurality of matrices corresponding to a column of the static compression matrix and a row of the static expansion matrix, and the dynamic channel fusion matrix represents an attention function aggregating attention scores for the plurality of matrices in the intermediate space. In this and/or other examples, the dynamic convolution neural network is configured to compose the static compression matrix, the dynamic channel fusion matrix, and the static expansion matrix into a dynamic residual matrix. In this and/or other examples, the dynamic convolution neural network is configured to compute a convolution of the input data based on a sum of the dynamic residual matrix with a static average kernel matrix. In this and/or other examples, the static average kernel matrix is weighted by a dynamic channel-wise attention diagonal matrix. In this and/or other examples, the dynamic convolution neural network has a dynamic convolution decomposition layer including a dynamic branch configured to compute elements of the dynamic channel fusion matrix and the dynamic channel-wise attention diagonal matrix. In this and/or other examples, the dynamic branch is configured to compress the input data via a pooling function. In this and/or other examples, the dynamic branch is configured to process the input data via a fully connected neural network layer configured to output the elements of the dynamic channel fusion matrix. In this and/or other examples, the dynamic branch is further configured to compute an activation function for the input data based on the sum of the dynamic residual matrix and the static average kernel matrix. In this and/or other examples, the method further comprises training the dynamic convolution neural network by adjusting the dynamic branch based on the activation function. In this and/or other examples, the dimensionality of the intermediate space is less than a square root of the number of channels. In this and/or other examples, the dynamic convolution neural network is configured to compute a pointwise convolution with dynamic attention across channels. In this and/or other examples, the dynamic convolution neural network is configured to compute a depthwise convolution with dynamic attention across neural network layers and dynamic fusion of latent kernel elements. In this and/or other examples, the dynamic convolution neural network is configured to compute a spatial convolution with dynamic fusion of channels. In this and/or other examples, the dynamic fusion of channels includes dynamic joint fusion of channels and latent kernel elements.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A computer system for automatic feature detection, comprising:
   a processor;
   a communication interface; and
   a memory configured to hold instructions executable by the processor to:
      instantiate a dynamic convolution neural network;
      receive input data via the communication interface;
      execute the dynamic convolution neural network to:
         compress the input data from an input space having a dimensionality equal to a predetermined number of channels into an intermediate space having a dimensionality less than the number of channels;
         dynamically fuse the channels into an intermediate representation within the intermediate space; and
         expand the intermediate representation from the intermediate space to an expanded representation in an output space having a higher dimensionality than the dimensionality of the intermediate space; and
         automatically detect features in the input data based on the expanded representation in the output space.

2. A method of computer-detecting features in an image, comprising:
   instantiating a dynamic convolution neural network configured to:
      compress an image from an input space having a dimensionality equal to a predetermined number of channels into an intermediate space having a dimensionality less than the number of channels;
      dynamically fuse the channels into an intermediate representation within the intermediate space; and
      expand the intermediate representation from the intermediate space to an output space having a higher dimensionality than the dimensionality of the intermediate space; and
   executing the dynamic convolution neural network to detect the features in the image.

3. A method of computer-detecting features in input data, comprising:
   instantiating a dynamic convolution neural network configured to:
      compress the input data from an input space having a dimensionality equal to a predetermined number of channels into an intermediate space having a dimensionality less than the number of channels;
      dynamically fuse the channels into an intermediate representation within the intermediate space; and
      expand the intermediate representation from the intermediate space to an output space having a higher dimensionality than the dimensionality of the intermediate space; and
   executing the dynamic convolution neural network to detect the features in the input data.

4. The method of claim 3, wherein the input data is compressed from the input space into the intermediate space via a static compression matrix.

5. The method of claim 3, wherein the channels are dynamically fused into the intermediate representation within the intermediate space via a dynamic channel fusion matrix having a plurality of elements that are each a function of the input data.

6. The method of claim 3, wherein the intermediate representation is expanded from the intermediate space to the output space via a static expansion matrix.

7. The method of claim 3, wherein:
   the input data is compressed from the input space into the intermediate space via a static compression matrix;
   the channels are dynamically fused into the intermediate representation within the intermediate space via a dynamic channel fusion matrix having a plurality of elements that are each a function of the input data;
   the intermediate representation is expanded from the intermediate space to the output space via a static expansion matrix; and
   the static compression matrix and the static expansion matrix represent a plurality of matrices, each matrix of the plurality of matrices corresponding to a column of the static compression matrix and a row of the static expansion matrix, and the dynamic channel fusion matrix represents an attention function aggregating attention scores for the plurality of matrices in the intermediate space.

8. The method of claim 7, wherein the dynamic convolution neural network is configured to compose the static compression matrix, the dynamic channel fusion matrix, and the static expansion matrix into a dynamic residual matrix.

9. The method of claim 8, wherein the dynamic convolution neural network is configured to compute a convolution of the input data based on a sum of the dynamic residual matrix with a static average kernel matrix.

10. The method of claim 9, wherein the static average kernel matrix is weighted by a dynamic channel-wise attention diagonal matrix.

11. The method of claim 10, wherein the dynamic convolution neural network has a dynamic convolution decomposition layer including a dynamic branch configured to compute elements of the dynamic channel fusion matrix and the dynamic channel-wise attention diagonal matrix.

12. The method of claim 11, wherein the dynamic branch is configured to compress the input data via a pooling function.

13. The method of claim 11, wherein the dynamic branch is configured to process the input data via a fully connected neural network layer configured to output the elements of the dynamic channel fusion matrix.

14. The method of claim 11, wherein the dynamic branch is further configured to compute an activation function for the input data based on the sum of the dynamic residual matrix and the static average kernel matrix.

15. The method of claim 14, further comprising training the dynamic convolution neural network by adjusting the dynamic branch based on the activation function.

16. The method of claim 3, wherein the dimensionality of the intermediate space is less than a square root of the number of channels.

17. The method of claim 3, wherein the dynamic convolution neural network is configured to compute a pointwise convolution with dynamic attention across channels.

18. The method of claim 3, wherein the dynamic convolution neural network is configured to compute a depthwise convolution with dynamic attention across neural network layers and dynamic fusion of latent kernel elements.

19. The method of claim 3, wherein the dynamic convolution neural network is configured to compute a spatial convolution with dynamic fusion of channels.

20. The method of claim 19, wherein the dynamic fusion of channels includes dynamic joint fusion of channels and latent kernel elements.

* * * * *